(12) United States Patent
Groth

(10) Patent No.: US 10,983,509 B2
(45) Date of Patent: Apr. 20, 2021

(54) METHOD FOR THE DECENTRALIZED CONTROL OF PROCESSING MACHINES

(71) Applicant: Uwe Groth, Wernetshausen (CH)

(72) Inventor: Uwe Groth, Wernetshausen (CH)

(73) Assignee: FERAG AG, Hinwil (CH)

( * ) Notice: Subject to any disclaimer, the term of this patent is extended or adjusted under 35 U.S.C. 154(b) by 206 days.

(21) Appl. No.: 14/975,108

(22) Filed: Dec. 18, 2015

(65) Prior Publication Data

US 2016/0179076 A1    Jun. 23, 2016

(30) Foreign Application Priority Data

Dec. 23, 2014   (CH) .................................. 02017/14

(51) Int. Cl.
| | |
|---|---|
| *G05B 11/01* | (2006.01) |
| *G05B 19/418* | (2006.01) |
| *B65H 43/00* | (2006.01) |
| *B65H 39/02* | (2006.01) |

(52) U.S. Cl.
CPC ......... *G05B 19/4183* (2013.01); *B65H 39/02* (2013.01); *B65H 43/00* (2013.01); *B65H 2301/323* (2013.01); *B65H 2301/435* (2013.01); *B65H 2301/4311* (2013.01); *B65H 2301/5111* (2013.01); *B65H 2511/512* (2013.01); *B65H 2553/43* (2013.01); *B65H 2553/52* (2013.01); *B65H 2701/1932* (2013.01); *G05B 2219/23231* (2013.01); *G05B 2219/31296* (2013.01); *G05B 2219/31304* (2013.01);

(Continued)

(58) Field of Classification Search
CPC ...... G05B 19/4183; G05B 2219/31311; G05B 2219/31304; G05B 2219/31296; G05B 2219/40006; G05B 2219/31309; G05B 2219/23231; B65H 39/02; B65H 43/00; B65H 2301/323; B65H 2301/4311; B65H 2301/435; B65H 2301/5111; B65H 2511/512; B65H 2553/43; B65H 2553/52; B65H 2701/1932; B65H 2220/01; Y02P 90/10; Y02P 90/02
See application file for complete search history.

(56) References Cited

U.S. PATENT DOCUMENTS 9,789,572 B1 * 10/2017 Cheung ................ B23P 21/004
2003/0183696 A1   10/2003 Boos et al.
(Continued)

FOREIGN PATENT DOCUMENTS

| | | |
|---|---|---|
| DE | 10 2011 087 274 A1 | 5/2013 |
| EP | 0 491 657 A1 | 6/1992 |

(Continued)

*Primary Examiner* — Zhipeng Wang
(74) *Attorney, Agent, or Firm* — Pauley Erickson & Swanson

(57) ABSTRACT

A method for controlling machines (M1, M2, . . . ), which are provided for the processing of objects (O1, O2, . . . ), includes introducing an object (O1, O2, . . . ) into a working region of a machine (M1, M2, . . . ) and accessing, in a local environment of the machine (M1, M2, . . . ), a process key (PS1, PS2, . . . ), which is associated with the object (O1, O2, . . . ) and which contains at least one URI (unified resource identifier). The object (O1, O2, . . . ) is then processed using the URI contained in the process key (PS1, PS2, . . . ).

10 Claims, 1 Drawing Sheet

(52) U.S. Cl.
CPC .............. *G05B 2219/31309* (2013.01); *G05B 2219/31311* (2013.01); *G05B 2219/40006* (2013.01); *Y02P 90/02* (2015.11)

(56) References Cited

U.S. PATENT DOCUMENTS

| | | | |
|---|---|---|---|
| 2005/0092839 A1* | 5/2005 | Oram | G07B 11/02 |
| | | | 235/462.13 |
| 2006/0224250 A1* | 10/2006 | Callaghan | G05B 19/054 |
| | | | 700/1 |
| 2009/0175453 A1 | 7/2009 | Shinbori et al. | |
| 2009/0211479 A1 | 8/2009 | Foley et al. | |
| 2010/0134253 A1 | 6/2010 | Mäder | |
| 2010/0191352 A1 | 7/2010 | Quail | |
| 2011/0023416 A1* | 2/2011 | Leu | B65B 5/045 |
| | | | 53/415 |
| 2011/0025458 A1 | 2/2011 | Rokhsaz et al. | |
| 2011/0079159 A1 | 4/2011 | Silberbauer et al. | |
| 2012/0029683 A1 | 2/2012 | Keller et al. | |
| 2012/0073247 A1 | 3/2012 | Kuenzli | |
| 2013/0061337 A1* | 3/2013 | Zimberoff | H04L 63/10 |
| | | | 726/30 |
| 2014/0005817 A1* | 1/2014 | Brewer | G05B 15/02 |
| | | | 700/112 |
| 2014/0135969 A1 | 5/2014 | Groth | |
| 2014/0282032 A1* | 9/2014 | Brown | G06F 3/0484 |
| | | | 715/738 |
| 2015/0088620 A1 | 3/2015 | Wittek | |
| 2015/0102100 A1 | 4/2015 | Hattrup et al. | |
| 2015/0134115 A1* | 5/2015 | Gong | B25J 9/1697 |
| | | | 700/259 |
| 2015/0195101 A1 | 7/2015 | Rashid et al. | |
| 2015/0237165 A1* | 8/2015 | Evans | H04L 67/02 |
| | | | 709/203 |

FOREIGN PATENT DOCUMENTS

| | | |
|---|---|---|
| EP | 1 699 020 A1 | 9/2006 |
| EP | 1 911 583 A1 | 4/2008 |
| EP | 2 333 627 A2 | 6/2011 |
| EP | 2 388 670 A1 | 11/2011 |
| WO | WO 01/80146 A1 | 10/2001 |
| WO | WO 01/89818 A1 | 11/2001 |
| WO | WO 2006/130691 A2 | 12/2006 |

* cited by examiner

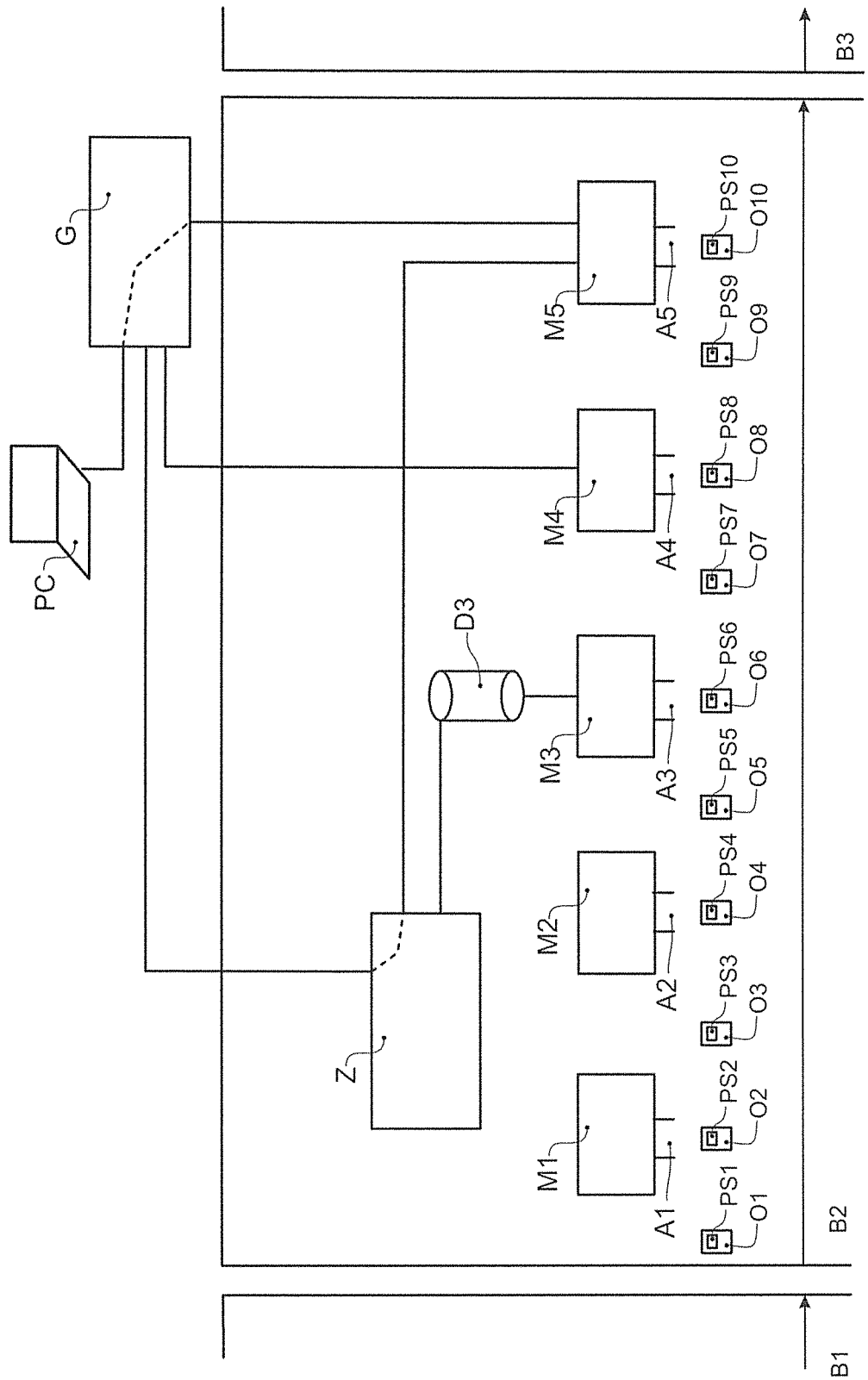

METHOD FOR THE DECENTRALIZED CONTROL OF PROCESSING MACHINES

CROSS-REFERENCE TO RELATED APPLICATION

Swiss Patent Application 02017/14, filed 23 Dec. 2014, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The invention relates to a method for controlling machines, which are provided for the processing of objects.

Discussion of Related Art

When ordering articles, for example, electronics articles, clothing, etc., confirming the postal delivery in an email directed to the customer and also specifying a URL (unified resource locator) therein, which points to a resource of the relevant postal service and permits the delivery progress of the postal consignment to be tracked, is known. Typical progress stations of a postal consignment comprise the transfer of the consignment at the postal service, arrival of the consignment in a distributing center, arrival of the consignment at a delivery service, and transfer of the consignment at the delivery address. The postal service updates the resource, which is accessible via the URL, accordingly in each case, so that the customer can always track the updated delivery progress. At the individual stations, in addition to the receiving, the further transport, the sorting, the acquiring/application of items of information, etc., no work steps take place which are performed on the content of the postal consignment and change it.

When ordering consumer goods which can be configured, such as a computer, an item of furniture, etc., providing a consumer with a corresponding order form which can be filled out is known, often via the access via a URL. The consumer fills out the order form and thus selects, for example, computer type, processor, storage capacity, graphic card type, etc., of a desired computer. After the order form is filled out, a specification of the consumer good is prepared and transmitted to a production or distribution service, wherein the corresponding consumer good is produced according to the specification for the consumer and delivered thereto.

In the laboratory analysis of samples, for example, blood samples, food samples, soil samples, etc., a unique identification code is attached to a sample, for example, in the form of a barcode. For the analysis, required work steps are performed on the sample, which are logged by means of the identification code in a central databank, together with the analysis results.

During the compilation of customer orders, for example, in the online mail-order business, various customer articles are arranged in a shipping container. The customer order is processed in a shipping center, which centrally controls the compilation of the customer articles in the shipping container.

In the compilation of printed products, for example, in the field of newspaper printing, various supplements are inserted into a main product. The compilation of the printed products is monitored by a control center, which centrally controls the individual work steps.

In the known automated systems for carrying out the above-mentioned processing and handling methods, the machines and facilities participating in the processing are typically connected to a central controller, which controls the individual work steps in real time.

In complex systems, this requires high-performance bus systems and control systems, which are costly and are also, with increasing complexity, susceptible to failure. The direct and permanent connection of the machines and facilities to the central controller additionally makes such systems more susceptible to attacks using harmful software, which have also greatly increased in recent time in industrial facilities.

In the case of segmented processing, i.e., processing at various locations and/or processing by various companies, additional problems result with respect to the security of the production and customer data.

SUMMARY OF THE INVENTION

One object of the invention is to provide a method for controlling machines for processing objects, which solves or at least reduces the above-mentioned problems.

This object is achieved by the method defined in independent patent claim 1.

The method according to the invention for controlling machines, which are provided for processing objects, comprises: introducing an object into a working region of a machine; accessing, in a local environment of the machine, a process key, which contains at least one URI, assigned to the object; processing the object using the URI contained in the process key.

Corresponding processing machines are in particular packaging machines or stations, for example, film wrapping stations, inscription machines or stations, compilation devices, sorters, path controllers for conveyor systems, storage/removal systems, processing machines, specifically those in the field of print processing, such as collection machines, insertion machines, or cutting machines.

The URI can already give information about the processing, which is to be performed on the object, without access to the resource to which the URI points.

Preferably, the resource, to which the URI contained in the process key points, is accessed for the processing of the object. The URI can point to a local or global resource. The machines for processing objects may thus be controlled very flexibly, without a central controller having to be provided.

In one variant, the URI points to a local resource, which is defined in a local environment of the machines. The resource is stored in a databank associated with the machine, for example.

In one variant, the URI points to a central resource, which is defined in a center associated with the machine. The resource is stored, for example, in a databank associated with the center.

In one variant, the URI points to a global resource, which is globally accessible. The resource is stored, for example, on a globally available Web server.

In one variant, the URI points to a resource which contains a reference, which points to a further resource. For example, it can be stored in a center for a specific resource, that the access is relayed to a global resource.

In one variant, the URI points to a resource which contains processing parameters, which are required for the processing of the object, for the machine. The processing parameters are provided by way of the access to the resource.

In one variant, the URI points to a secured resource, which requires an authentication and/or an electronic key for the access. An undesired or unpermitted access is thus prevented.

In one variant, the method furthermore comprises: storing data in the process key and/or in the resource, to which the URI contained in the process key points. The processing performed on an object can be logged, for example.

In one variant, the introduction of an object into the working region of a machine is performed by a conveyor means, such as a conveyor belt, or a conveyor, such as a hanging conveyor. Robust and cost-effective transportation units can be used for the introduction of an object into the working region.

In one variant, a process key attached to the object is accessed, in particular an optically readable one-dimensional or two-dimensional barcode and/or a radio-based readable RFID tag. By way of the attachment to the object, a permanent association between the object and the process key is ensured.

In one variant, at least one further object is added to the object during the processing thereof.

In one variant, at least two machines in separate regions participate. Separate regions can be defined in that the object is stored in a buffer in between them.

In one variant, the object is a main product or a subproduct to be added to the main product of a product compilation.

In one variant, the object is a customer container or a customer article to be added to the customer container of a product compilation. A customer container can be a bag, a sack, a container, such as a trough or a box, or a basket, or also a larger unit.

BRIEF DESCRIPTION OF THE DRAWINGS

The invention is explained hereafter on the basis of the FIGURE, which merely illustrates exemplary embodiments. In the FIGURE:

FIG. 1 schematically shows a work sequence having various work steps which are performed by machines on an object provided with a process key.

DESCRIPTION OF PREFERRED EMBODIMENTS

FIG. 1 schematically shows a first embodiment of a method for controlling machines M1, M2, . . . , which are provided for processing an object. The object is, for example, a newspaper, into which supplements are to be inserted. The object is, for example, a customer container, into which customer articles are to be placed. The object is, for example, a shipping container, in which shipping articles are to be arranged. The object is, for example, a supplement, which is provided for the insertion into a newspaper. The object is, for example, a customer article, which is provided for the placement in a customer container. The object is, for example, a shipping article, which is provided for the arrangement in a shipping container.

As schematically shown in FIG. 1, the machines M1, M2, . . . are provided to carry out processing steps successively on an object O1, O2, . . . . A machine can be provided for inserting a supplement into a newspaper. A machine can be provided for placing a customer article in a customer container. A machine can be provided for arranging a shipping article in a shipping container. A machine can be provided for preparing a supplement for the insertion into a newspaper. A machine can be provided for preparing a customer article for the placement in a customer container. A machine can be provided for preparing a shipping article for the arrangement in a shipping container.

A particularly preferred use of the method according to the invention is in the field of print processing, in particular using compilation devices. In this case, the machines M1, M2, . . . shown are packaging machines or stations, in particular film wrapping stations, inscription machines or stations, warehouses, buffer stations, sorters, path controllers for conveyor systems, storage and removal systems, and print processing facilities, such as collecting machines, insertion machines, or cutting machines in particular.

As schematically shown in FIG. 1, objects O1, O2, . . . are successively processed by the machines M1, M2, . . . . The objects O1, O2, . . . are conveyed on a conveyor means, for example, a conveyor belt here, on a conveyor, for example, a hanging conveyor, or corresponding means from one machine to the next machine. The objects O1, O2, . . . are conveyed, for example, by devices attached to the machines, for example, robot arms, from one machine M1 to the next machine M2. An object O1 is held stationary, for example, and the machines M1, M2, . . . are successively conveyed past the stationary object O1.

As schematically shown in FIG. 1, relevant process keys PS1, PS2 are typically associated with each of the objects O1, O2, . . . . A process key PS1, PS2 is, for example, printed, attached, glued, detachably connected, etc., on an object O1, O2, . . . . A process key PS1, PS2 is, for example, attached to a clamp of a clamp conveyor or hanging conveyor for conveying the objects O1, O2, . . . .

In one variant, a process key PS1, PS2, . . . is formed as an optically readable code, for example, as a one-dimensional or two-dimensional barcode.

In one variant, a process key PS1, PS2, . . . is formed as a radio-based readable tag, for example, as an RFID tag (RFID: radio frequency identification).

In one variant, the process key PS1, PS2, . . . is designed as writable. An optically readable code which is printed onto an object O1, O2, . . . , for example, may be supplemented by printing on further parts or may be replaced by an optically readable code printed on at another point of the object O1, O2, . . . , wherein in one variant, the original optical code can be marked as invalid, for example, by printing on corresponding parts. A radio-based readable tag, i.e., for example, an RFID tag, can be embodied as writable, wherein the data stored in the tag can be overwritten, supplemented, replaced, etc.

The access to the process key is performed in each case by a corresponding reading device, which is typically provided at the machines M1, M2, . . . . An optical read device, for example, a photographic camera, is provided for the access to an optical code. A radio-based read device, for example, an RFID read device, is provided for the access to a radio-based readable tag. A printer can be provided on a relevant machine M1, M2, . . . for writing an optical code. The RFID read device can be embodied as an RFID read/write device and can be designed for writing an RFID tag.

A process key PS1, PS2, . . . comprises at least one URI (URI: uniform resource identifier).

A uniform resource identifier is constructed as follows according to a known scheme:

URI=scheme ":" hier-part ["?" query]["#" fragment]

The components of the uniform resource identifier are listed in the following example.

foo://example.com: 8042/over/there?name=ferret#nose

The resource comprises a scheme which defines the context and identifies the type of the URI. Known schemes are, for example, the protocols HTTP and FTP. A colon and a path for locating the resource follow directly thereon.

The path comprises an authority (i.e., for example, example.com:8042), a path (i.e., for example, /over/there), a query (i.e., for example, ?name=ferret), and a fragment (i.e., for example, #nose).

The authority can identify a host and can contain user inputs. The path contains specifications which identify a resource. The query contains data for identifying resources, which cannot be precisely located by the specification of the path. The fragment references a point within a resource.

A process key PS1, PS2, . . . comprises in one variant, in addition to the URI, arbitrary further data, for example, a brief or extensive description of the object O1, O2, . . . to which the process key PS1, PS2, . . . is attached, control instructions for machines M1, M2, . . . , etc. A brief description of an object O1, O2, . . . can comprise an object class, an object type, etc. An extensive description of an object O1, O2, . . . can comprise object data such as production date, specifications about the interfaces of the object, specifications about the service life, etc.

The URI can be formed according to various forms, which are explained on the basis of the following examples. In this case, a machine M is provided for the processing of an object O, wherein a process key PS, which contains the URI, is associated with the object O.

In a first form, the URI is formed according to the scheme M.local/f/s. It is thus specified that the resource required for the processing of an object is defined locally on the machine M. This is specified by the authority M.local, which points to the machine M. The path /f/s defines a specific processing step, for example, the subroutine s of the function f, which is to be performed by the machine.

In a second form, the URI is formed according to the scheme Z.local/f/s. It is thus specified that the resource required for the processing of an object is defined locally on a center Z. This is specified by the authority Z.local, which points to the center Z. The path /f/s defines a specific processing step, for example, the subroutine s of the routine f, which is to be performed by the center Z. In one variant, the path /f/s defines the query of processing parameters, which are to be applied for the processing of the object.

In a third form, the URI is formed according to the scheme G.name.net/f/s. It is thus specified that the resource required for the processing of an object is defined on a network server S. This is specified by the authority s.name.net, which points to the network server S, which is located in the domain name of the top level domain net. The path /f/s defines a specific processing step, for example, the subroutine s of the function f, which is to be performed by the network server S. In one variant, the path /f/s defines the query of a processing value, which is to be applied for the processing of the object.

In FIG. 1, the reference signs B1, B2, B3 identify different regions, which comprise machines M1, M2, . . . , which are provided for the processing of objects O1, O2, . . . . The regions illustrated in FIG. 1 having the reference signs B1, B3 are only rudimentarily apparent, but comprise machines, center, conveyor device, etc., like the region shown with reference sign B2.

As shown in FIG. 1, the region shown with reference sign A2 comprises various machines M1, M2, . . . , which are provided for the processing of objects O1, O2, . . . . As indicated by the arrow, the objects O1, O2, . . . are guided by a conveyor device past working regions A1, A2, . . . of the machines M1, M2, . . . . The machines M1, M2, . . . are configured to process an object O1, O2, . . . , which is located in the working region A1, A2, . . . of the machine 1, M2, . . . . The processing of an object O1, O2, . . . comprises arbitrary processing steps, for example, the insertion of a supplement into a newspaper, the placement of a customer article in a customer container, the arrangement of a shipping article in a shipping container, etc.

A total of five machines M1, M2, M3, M4, M5 are schematically shown in FIG. 1, which are provided for the processing of a total of ten objects O1, O2, O3, O4, O5, O6, O7, O8, O9, O10. While, as shown in FIG. 1, the objects O2, O4, O6, O8, O10 having an even number in the reference sign are each located in the working region of the relevant machine M1, M2, M3, M4, M5, the objects O1, O3, O5, O7, O9 having an odd number in the reference sign are located between or in the sequence in front of the machines M1, M2, M3, M4, M5. The regular arrangement of the machines M1, M2, M3, M4, M5 and objects O1, O2, O3, O4, O5, O6, O7, O8, O9, O10 is not a requirement for the method according to the invention. In the case of the insertion of supplements into a newspaper, the placement of customer articles in customer containers, the arrangement of a shipping article in a shipping container, however, the regular sequence of objects O1, O2, O3, O4, O5, O6, O7, O8, O9, O10 is frequently to be encountered.

As schematically shown in FIG. 1, the object having reference sign O2 is processed by the machine having reference sign M1. For example, it is checked by the machine M1 whether the object O2 is suitable for the processing by subsequent machines M2, M3, . . . . The first machine M1 accesses the process key PS2 of the object O2 and analyzes the URI contained in the process key PS2. The machine M1 can decide by way of the analysis whether the object O2 is suitable for the processing by the further machines and can perform corresponding measures, for example, relaying to the subsequent machine having the reference sign M2 or the removal of the object O2 from the conveyor section.

In the scope of the invention, the objects O1, O2, . . . are processed by the machines M1, M2, . . . . This processing can comprise a physical change of one or more objects, for example, the trimming of the objects in a cutting station, or a relative restructuring of the objects, for example, adding an object Om to an object On, or the change of the sequence of objects, for example, from a group Om-On-Op to a group Om-Op-On.

In one variant, the machine having the reference sign M1 is provided to process the object having the reference sign O2. The URI contained in the process key PS2 of the object O2 is a URI of the above-defined first form, i.e., for example, the URI M.local/f/s. The processing parameters required for the processing of the object are all defined on the machine M1.

As schematically shown in FIG. 1, the machine having the reference sign M2 is provided for processing the object O4. The URI contained in the process key PS4 of the object O4 is a URI of the above defined second form, i.e., for example, the URI Z.local/f/s. The processing parameters required for the processing of the object are defined in the center Z. By accessing the resource contained in the center Z, the processing parameters which are required for processing the object O4 are available to the machine M2.

As schematically shown in FIG. 1, a data memory D3 is associated with the machine having the reference sign M3, for example, connected to the machine M3. The machine M3 is provided to process the object having the reference sign O6. The URI defined in the process key PS6 of the object O6 is a URI of the above defined first form, i.e., for example, the URI m.local/f/s. The processing parameters required for the processing of the object are all defined on the machine M3. The machine M3 is additionally configured to capture the log data, which arise during the processing of an object O6, for example, quality parameters of the processing. The log data can be stored in the data memory D3. It can be provided that the log data are transmitted to the center Z immediately, after passage of a time interval, on request, etc. On the basis of the log data, the center can transmit, for example, control commands to participating machines M1, M2, M3, M4, M5. In one variant, the log data can be stored in the process key PS6 of the object O6, for example, by printing on or supplementing an optical code printed on the object O6, by storing the data in a radio-based accessible RFID tag, etc.

As schematically shown in FIG. 1, the machine having the reference sign M4 is provided for processing the object O8. The URI contained in the process key PS8 of the object O8 is a URI of the above-defined third form, i.e., for example, the URI G.name.net/f/s. The processing parameters required for the processing of the object O8 are defined as globally accessible. By access to the globally defined resource, the processing parameters, which are required for the processing of the object O8, are available to the machine M4.

As schematically shown in FIG. 1, the machine having the reference sign M5 is provided for processing the object O10. The URI contained in the process key PS10 of the object O10 is a URI of the above defined second form, i.e., for example, the URI Z.local/f/s. The processing parameters required for the processing of the object O10 are queried at the center Z. As schematically shown in FIG. 1, a reference to a globally available resource is stored in the center Z. As schematically shown in FIG. 1, the required processing parameters are made available to the machine M5 by the global resource G.

The regions B1, B2, B3 which have the machines M1, M2, . . . required for the processing of objects O1, O2, . . . often relate to locations such as production operation, logistics operation, etc., which are closed per se. It is therefore necessary in the prior art to provide all of the parameters required for the processing of objects in these regions at of these locations. For example, in the case of the production of addressed printed products, the entire address data collection must be provided in the relevant region B1, B2, B3.

This is not necessary in the method which is schematically shown in FIG. 1, since required address data can be produced in each case by the relevant machine by access to the URI stored in the process key. For example, the machine shown in FIG. 1 having the reference sign M4 is provided for printing on an address. By way of the (secured) access to the globally available resource G, the address data required for the object having reference sign O8 can be provided to the machine M4. Therefore, an entire address data collection is never present on the machine M4 or in the region B2, but rather in each case only individual address data required for a specific object O8. Furthermore, it can be ensured more simply by the access using the URI to the globally available resource G that the address data are up to date, for example, in that the receiver having the relevant address data updates the globally available resource G by means of personal computer PC as needed, as schematically shown in FIG. 1.

In the method which is schematically shown in FIG. 1, it is possible that a user performs desired changes in the global resource G at the time of the processing of the object O1, O2, . . . by the machines M1, M2, . . . , which are immediately applied during the processing of an object O1, O2, . . . . For example, the user can change the globally available resource G by access via a personal computer PC until shortly before the processing of the object having reference sign O8 by the machine having the reference sign M4. Since the machine M4 accesses, via the URI, the global resource G for processing the object O8, the respective up-to-date processing parameters for processing the object O8 are provided to the machine (for example, changes to an order at short notice, for example, no longer supplements relating to sport, but new supplements relating to culture).

In the method which is schematically shown in FIG. 1, it is possible to protect sensitive items of information from undesired access. This is made possible, for example, by the access shown on the example of the machine having reference sign M5. In the center Z, it is only stored with a reference that global resource G is responsible for the delivery of processing parameters. The processing parameters are transmitted from the global resource G directly to the machine M5, without the center Z being involved (example: customer-specific supplements, which are based on an analysis of customer data, which are not to be accessible to the center Z).

I claim:

1. A method for controlling processing machines, which are provided for the processing of physical objects, comprising:
   introducing a physical object to be processed into a working region of a processing machine adapted to process the physical object;
   accessing, in a local environment of the processing machine, a process key element, which is associated with the physical object and which contains at least one URI (unified resource identifier) pointing to a first central resource defined in a center associated with the processing machine, wherein said first, central resource comprises a reference, pointing to a second, secured global resource that is globally accessible and wherein the second, secured global resource requires authentication and/or an electronic key for access, wherein the process key element is adapted to be accessed by a reading device; and
   processing the physical object using the URI contained in the process key element, wherein the second, global resource to which the reference comprised in the central resource and to which the URI contained in the process key element points is directly accessed for the processing of the physical object.

2. The method according to claim 1, wherein the URI points to a local resource, which is defined in a local environment of the processing machines.

3. The method according to claim 1, wherein the URI points to a resource, which contains processing parameters required for the processing of the physical object.

4. The method according to claim 1, furthermore comprising: storing data in the process key element and/or in the resource, to which the URI contained in the process key element points.

5. The method according to claim 1, wherein the introduction of the physical object into the working region of the processing machine is performed by a conveyor means, in particular a conveyor belt, or a conveyor, in particular a hanging conveyor.

6. The method according to claim 1, wherein a process key element attached to the physical object is accessed, in particular an optically readable one-dimensional or two-dimensional barcode and/or a radio-based readable RFID tag.

7. The method according to claim 1, wherein, during the processing of the physical object, at least one further physical object is added thereto.

8. The method according to claim 1, wherein at least two processing machines participate at separate regions.

9. The method according to claim 1, wherein the physical object is a main product or a subproduct to be added to the main product of a product compilation.

10. The method according to claim 1, wherein the physical object is a customer container or a customer article to be added to the customer container of a product compilation.

* * * * *